(12) United States Patent
Ahn

(10) Patent No.: US 10,066,726 B2
(45) Date of Patent: Sep. 4, 2018

(54) WORM WHEEL OF REDUCTION GEAR FOR USE IN ELECTRIC POWER STEERING

(71) Applicant: MANDO CORPORATION, Pyeongtaek-si, Gyeonggi-do (KR)

(72) Inventor: Hee Chul Ahn, Seoul (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 310 days.

(21) Appl. No.: 14/990,798

(22) Filed: Jan. 8, 2016

(65) Prior Publication Data

US 2016/0201785 A1 Jul. 14, 2016

(30) Foreign Application Priority Data

Jan. 12, 2015 (KR) ........................ 10-2015-0004236

(51) Int. Cl.
*F16H 55/22* (2006.01)
*B62D 5/04* (2006.01)

(52) U.S. Cl.
CPC ............... *F16H 55/22* (2013.01); *B62D 5/04* (2013.01)

(58) Field of Classification Search
CPC .................................... F16H 55/22; F16H 5/04
See application file for complete search history.

(56) References Cited

U.S. PATENT DOCUMENTS

| 4,077,274 A * | 3/1978 | Johnson | F16H 55/12 74/425 |
| 5,259,261 A * | 11/1993 | Michel | E05F 11/505 403/225 |
| 6,393,929 B1 * | 5/2002 | Quere et al. | F16H 1/16 74/411 |
| 6,644,431 B2 * | 11/2003 | Kuze et al. | B62D 5/0409 180/444 |
| 2002/0029648 A1 | 3/2002 | Noguchi et al. | |

(Continued)

FOREIGN PATENT DOCUMENTS

| CN | 103287481 A | 9/2013 |
| CN | 203868244 U | 10/2014 |

(Continued)

OTHER PUBLICATIONS

German Office Action dated Feb. 2, 2017 corresponding to German Application No. DE 10 2016 000 202.6.

(Continued)

*Primary Examiner* — David M Fenstermacher
(74) *Attorney, Agent, or Firm* — Hauptman Ham, LLP

(57) ABSTRACT

A worm wheel of a reduction gear for an electric power steering includes: a boss part including a hollow portion formed along an axial-direction center for coupling of a shaft and having first coupling surfaces, each of which is formed by a first convex surface and a first concave surface continuously repeated along an outer peripheral surface; and a tooth-shaped part having second coupling surfaces, each of which is formed by a second convex surface and a second concave surface continuously repeated along an inner peripheral surface, such that the second coupling surfaces are coupled corresponding to the first coupling surfaces, wherein a plurality of teeth are continuously formed along a periphery thereof with spacing portions interposed therebetween.

12 Claims, 4 Drawing Sheets

(56) References Cited

U.S. PATENT DOCUMENTS

| | | | |
|---|---|---|---|
| 2002/0112555 A1* | 8/2002 | Chikaraishi et al. | ............................ B62D 5/0409 74/388 PS |
| 2005/0039561 A1* | 2/2005 | Rupp | .................. B62D 5/008 74/425 |
| 2008/0156132 A1* | 7/2008 | Pachov | .................. B66D 1/14 74/425 |
| 2009/0120711 A1* | 5/2009 | Shiino | .................. B62D 5/0406 180/443 |
| 2012/0240707 A1* | 9/2012 | Pachov | .................. B66D 1/14 74/425 |
| 2016/0201761 A1* | 7/2016 | Kwon | .................. F16C 35/063 74/425 |

FOREIGN PATENT DOCUMENTS

| | | |
|---|---|---|
| DE | 102008056719 A1 | 5/2009 |
| JP | 2004052791 A | 2/2004 |
| KR | 1020070051180 A | 5/2007 |

OTHER PUBLICATIONS

German Office Action for corresponding Korean Patent Application No. 10-2015-0004236 dated Sep. 13, 2016.
Chinese Office Action dated Dec. 12, 2017 for Chinese Application No. 201610018114.8.

\* cited by examiner

WORM WHEEL OF REDUCTION GEAR FOR USE IN ELECTRIC POWER STEERING

CROSS-REFERENCE(S) TO RELATED APPLICATION

This application claims priority of Korean Patent Application No. 10-2015-0004236, filed on Jan. 12, 2015, in the Korean Intellectual Property Office, which is hereby incorporated by reference in its entirety.

BACKGROUND OF THE INVENTION

Field of the Invention

The present invention relates to a worm wheel of a reduction gear for an electric power steering, and more particularly, to a worm wheel of a reduction gear for an electric power steering, in which coupling surfaces of a boss part and a tooth-shaped part are formed to have a curved shape such as a wave pattern and are coupled in a male-female configuration, so that a contact area therebetween is increased and a curve is formed along a rotational direction, thus increasing a coupling strength.

Description of the Related Art

In general, an electric power steering (EPS) system makes a steering effort of a steering wheel soften during parking or low-speed driving according to a traveling speed of a vehicle due to motor power.

The EPS system provides a driver with a heavy steering sense for stability during a high speed driving and allows a driver to perform a rapid steering in case of emergency, thus providing a driver with an optimal steering condition.

As such, the EPS system allows a driver to perform a steering operation even with a small force regardless of a steering gear ratio and can absorb a shock generated due to unevenness of a road and prevent the shock from being transferred to a steering wheel.

In addition, recently, according to a driving condition detected by a vehicle speed sensor, a steering torque sensor, or the like, an electronic control unit (ECU) is used to operate a motor to provide a driver with a light and convenient steering sense during a low speed driving and a heavy steering sense and a stable directionality during a high speed driving, and to allow a driver to perform a rapid and instant steering in case of emergency. In other words, it is a current trend to employ an EPS system in order to provide drivers with optimal steering conditions.

Examples of the EPS system include an electro-hydraulic power steering (EHPS) system and a motor driven power steering (MDPS) system. Unlike a hydraulic system that forms a hydraulic pressure in pump and assists power, the MDPS system is configured to assist steering power by using a torque of a motor and assist steering force in such a manner that a worm shaft connected to a motor for generating power rotates a worm wheel connected to a steering shaft.

The worm wheel includes a boss part and a tooth-shaped part. The boss part has a hollow portion formed in an axial direction such that the worm wheel is connected to the steering shaft. The tooth-shaped part is connected to a periphery of the boss part and is engaged with the worm shaft.

However, in the conventional worm wheel, when the boss part and the tooth-shaped part are coupling-molded, a coupling portion of the boss part and the tooth-shaped part is shrunk to a predetermined depth. Thus, it is feared that a gap will be formed between a coupling surface between the boss part and the tooth-shaped part.

As the prior art document related to the present invention, Korean Patent Application Publication No. 10-2007-0051180 (May 17, 2007) discloses a power steering system.

SUMMARY OF THE INVENTION

The present invention provides a worm wheel of a reduction gear for an electric power steering, in which coupling surfaces of a boss part and a tooth-shaped part are formed to have a curved shape such as a wave pattern and are coupled in a male-female configuration, so that a contact area therebetween is increased and a curve is formed along a rotational direction, thus increasing a coupling strength, and it is possible to reduce shrinkage after injection molding, so that no gaps are formed at a coupling portion between teeth and the boss part, thus ensuring the reliability of products.

According to an embodiment of the present invention, a worm wheel of a reduction gear for an electric power steering includes: a boss part including a hollow portion formed along an axial-direction center for coupling of a shaft and having first coupling surfaces, each of which is formed by a first convex surface and a first concave surface continuously repeated along an outer peripheral surface; and a tooth-shaped part having second coupling surfaces, each of which is formed by a second convex surface and a second concave surface continuously repeated along an inner peripheral surface, such that the second coupling surfaces are coupled corresponding to the first coupling surfaces, wherein a plurality of teeth are continuously formed along a periphery thereof with spacing portions interposed therebetween.

The first convex surface and the first concave surface may be mutually coupled to form a wave-shaped curved surface, and the second convex surface and the second concave surface may be mutually coupled to form a wave-shaped curved surface.

A center of the first convex surface and the second concave surface may be located to match a center of the teeth, and a center of the first concave surface and the second convex surface may be located between spacing portions of the teeth and is located to match a center of the spacing portion.

A center of a horizontal line connecting adjacent centers of the spacing portions and the first convex surface may be formed at intervals of 1.0 to 2.0 mm.

A center of the first concave surface and the spacing portion may be formed at intervals of 2.0 to 3.0 mm.

The first coupling surfaces and second coupling surfaces may be spaced apart on both axial-direction sides of the boss part.

The worm wheel may further include a plurality of groove portions and a plurality of rib portions correspondingly formed on both axial-direction surfaces of the boss part between the hollow portion and the first coupling surface, wherein the groove portions and the rib portions are continuously and repeatedly formed at equal intervals along a circumferential direction with reference to a central axis line of the hollow portion.

The rib portion may include: a plurality of first protrusions extending in an outer periphery direction from an edge of the hollow portion and arranged radially with respect to a center axis line; a plurality of second protrusions to which one extending ends of the first protrusions are integrally coupled and which form a concentric circle with the central axis line of the hollow portion; and a plurality of third protrusions connected from a periphery of the second protrusion to the first coupling surface and disposed radially with respect to the central axis line of the hollow portion.

The third protrusions may be disposed between the first protrusions and the number of the third protrusions may be twice the number of the first protrusions.

The first protrusions, the second protrusions, and the third protrusion may be formed to have a thickness of 3.5 to 4.5 mm from a bottom surface of the groove portion along an axial direction of the boss part.

The first protrusions may be formed to have a thickness of 2.0 to 4.0 mm along a concentric circle direction of the hollow portion.

The both axial-direction surfaces of the boss part where the groove portions are formed may be formed to have a thickness of 3.5 to 4.5 mm.

The third protrusions may be formed to have a thickness of 1.0 to 2.0 mm along a concentric circle direction of the hollow portion.

A gas discharge hole may be formed on the coupling surface between the first coupling surface and the second coupling surface along an axial direction of the boss part.

DETAILED DESCRIPTION OF EXEMPLARY EMBODIMENTS

Hereinafter, exemplary embodiments of the present invention will be described in detail with reference to the accompanying drawings.

The advantages and features of the present invention and methods for achieving them will become more apparent from the following embodiments that are described in detail in conjunction with the accompanying drawings.

However, the present invention is not limited to the following embodiments and may be implemented in various forms. These embodiments are provided so that this disclosure will be thorough and complete, and will fully convey the scope of the invention to those skilled in the art, and the scope of the present invention is defined by the appended claims.

In addition, in some embodiments, detailed descriptions of well-known elements, operations, and technologies will be omitted since they would unnecessarily obscure the subject matters of the present invention.

Figure 1:
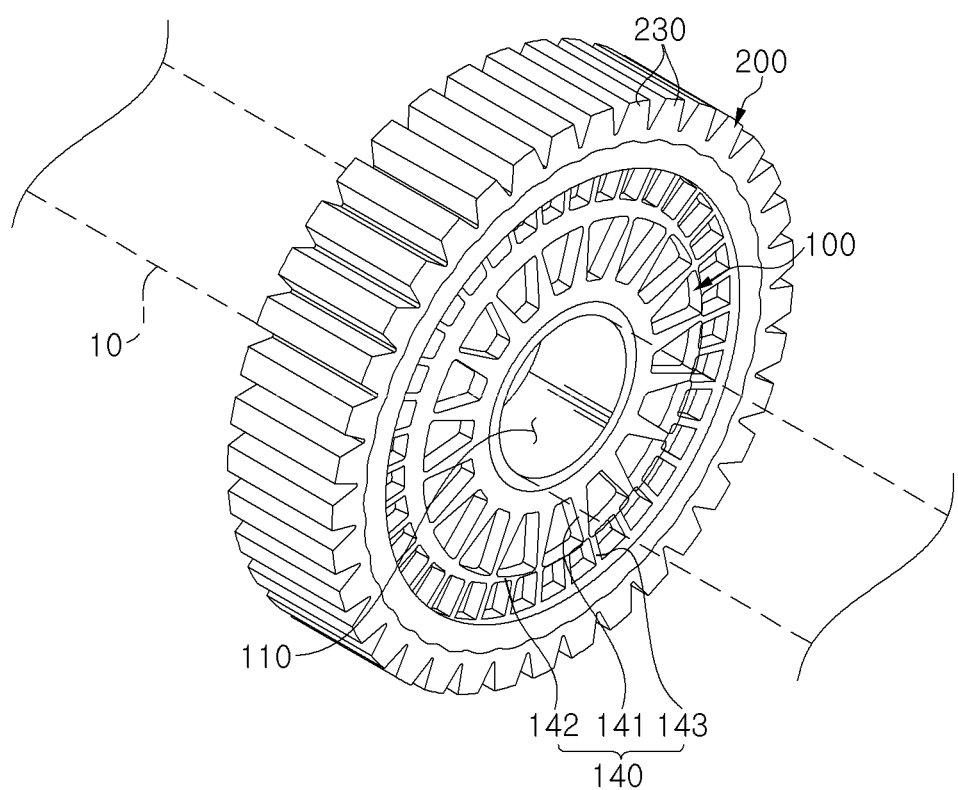
FIG. 1 is a perspective view illustrating a worm wheel of a reduction gear for an EPS according to the present invention.
Figure 2:
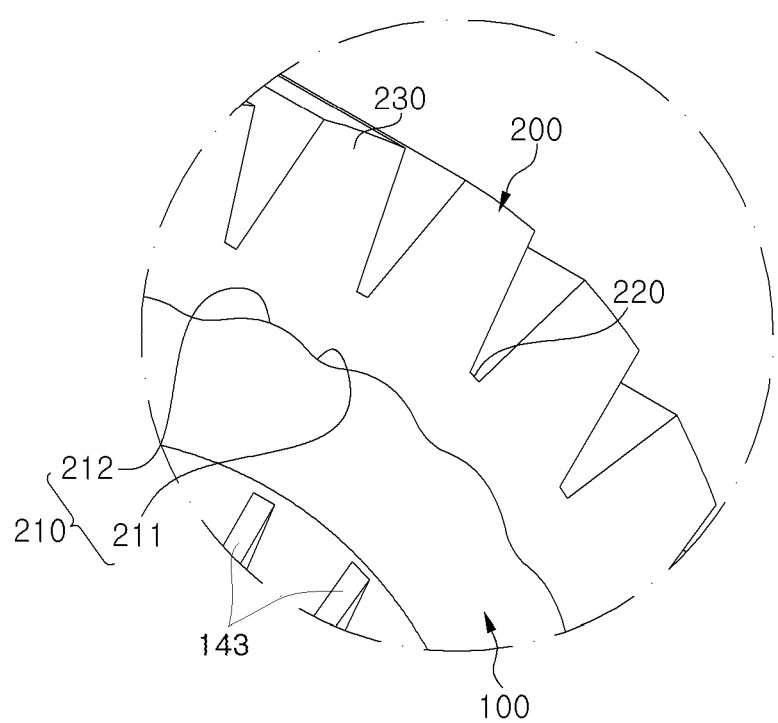
FIG. 2 is a partial enlarged perspective view illustrating the worm wheel of the reduction gear for the EPS according to the present invention.

FIG. 1 is a perspective view illustrating a worm wheel of a reduction gear for an EPS according to the present invention, and FIG. 2 is a partial enlarged perspective view illustrating the worm wheel of the reduction gear for the EPS according to the present invention.

Figure 3:
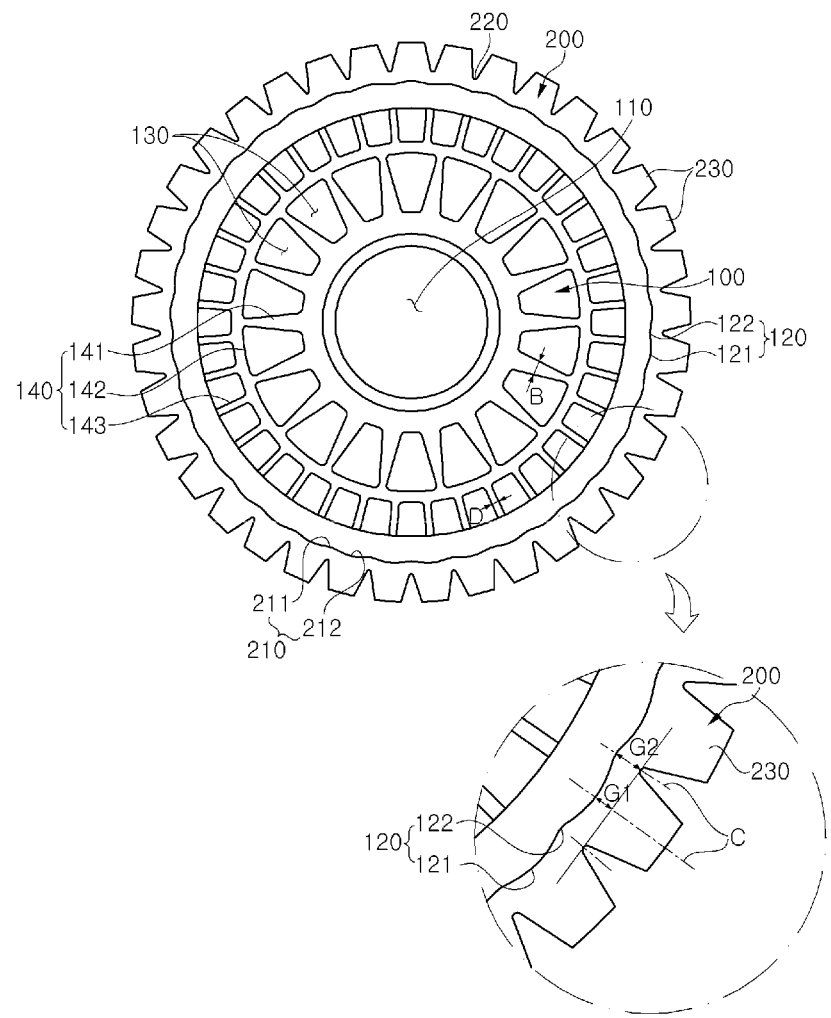
FIG. 3 is a side view illustrating the worm wheel of the reduction gear for the EPS according to the present invention.
Figure 4:
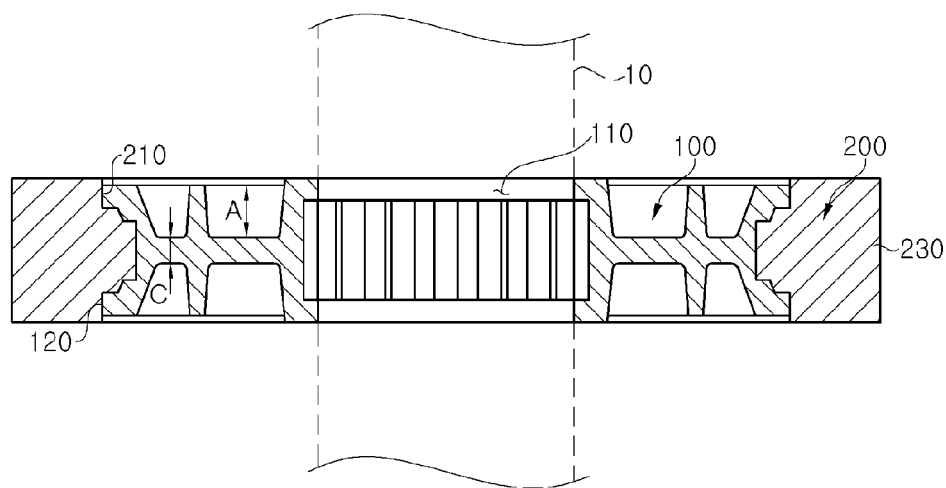
FIG. 4 is a front sectional view illustrating the worm wheel of the reduction gear for the EPS according to the present invention.

FIG. 3 is a side view illustrating the worm wheel of the reduction gear for the EPS according to the present invention, and FIG. 4 is a front sectional view illustrating the worm wheel of the reduction gear for the EPS according to the present invention.

As illustrated in FIGS. 1 to 4, the worm wheel of the reduction gear for the EPS according to the present invention includes a boss part 100 and a tooth-shaped part 200.

The boss part 100 forms an inner body of the worm wheel. The boss part 100 has a disc shape and includes a hollow portion 110 at the center thereof in an axial direction.

A shaft 10 for transmitting a rotational torque of a steering wheel (not illustrated) is inserted into and coupled to the hollow portion 110.

The boss part 100 has first coupling surfaces 120, each of which is formed by a first convex surface 121 and a first concave surface 122 continuously repeated along an outer peripheral surface.

The first convex surface 121 and the first concave surface 122 are mutually coupled to form a wave-shaped curved surface as illustrated in FIGS. 1 and 3.

The size and number of the first convex surface 121 and the first concave surface 122 may be differently applied according to the size and number of the boss part 100 and the size and number of teeth 230 to be described below.

Since the first convex surface 121 and the first concave surface 122 have the curved shape, it is possible to increase a contact area between a second convex surface 211 and a second concave surface 212 to be described below.

In addition, since the first convex surface 121 and the first concave surface 122 are latched with the second convex surface 211 and the second concave surface 212, it is possible to increase a coupling strength.

Furthermore, the first coupling surfaces 120 and second coupling surfaces 210 may be spaced apart on both axial-direction sides of the boss part 100.

At this time, groove portions each having a predetermined area and depth may be formed between the first coupling surfaces 120 and the second coupling surfaces 210, and the tooth-shaped part 200 may be coupled in a state of filling the groove portions.

A gas discharge hole (not illustrated) may be formed at the coupling portion between the first coupling surface 120 and the second coupling surface 210 along an axial direction of the boss part 100.

The gas discharge hole may be formed along an axial direction at the boundary where the first coupling surface 120 and the second coupling surface 210 are coupled to each other, the gas discharge hole may be formed to have a circular shape.

That is, by forming the gas discharge hole at the boundary where the first coupling surface 120 and the second coupling surface 210 are coupled to each other, it is possible to provide a structure that does not greatly reduce the strength while improving the gas discharge performance of the worm wheel.

The tooth-shaped part 200 may be coupled along the periphery of the boss part 100 and be engaged with a gear of a worm shaft (not illustrated) to transmit power.

The tooth-shaped part 200 may be molded by using double injection in a state in which the outer peripheral surface of the boss part 100 is coupled.

A hollow part is formed in the center of the tooth-shaped part 200 in an axial direction. The tooth-shaped part 200 includes a plurality teeth 230 continuously formed along the periphery thereof with spacing portions 220 interposed therebetween.

The tooth-shaped part 200 has second coupling surfaces 211, each of which is formed by a second convex surface 211 and a second concave surface 212 continuously repeated along an inner peripheral surface.

The second convex surface 211 and the second concave surface 212 are mutually coupled to form a wave-shaped curved surface as illustrated in FIGS. 1 and 3.

The size and number of the second convex surface 211 and the second concave surface 212 may correspond to the size and number of the first convex surface 121 and the second concave surface 112 described above.

As illustrated in FIG. 3, the center C of the first convex surfaces 121 and the second concave surfaces 212 may be located to match the center C of the teeth 230.

In addition, the center C of the first concave surfaces 122 and the second convex surfaces 211 may be located between the spacing portions 220 of the teeth 230.

In addition, the center C of the first concave surfaces 122 and the second convex surfaces 211 may be located to match the center C of the spacing portion 220.

In addition, when a horizontal line connecting the adjacent centers C of the spacing portions 220 is drawn, the center C of the horizontal line may be formed at intervals of 1.0 to 2.0 mm with respect to the center C of the first concave surfaces 121.

In addition, the center C of the first concave surfaces 122 and the spacing portions 220 may be formed at intervals of 2.0 to 3.0 mm.

That is, the first convex surfaces 121 and the second concave surfaces 212 have a convex shape toward the inside of the teeth 230, and the first concave surfaces 122 and the second convex surfaces 211 have a convex shape in a direction opposite to the spacing portions 220.

Since the second convex surfaces 211 and the second concave surfaces 212 have the curved shape, it is possible to increase a contact area between the second convex surfaces 211 and the second concave surfaces 212.

A plurality of groove portions 130 and a plurality of rib portions 140 are formed on both axial-direction sides of the boss part 100 in the other regions except for the hollow portion 110.

As illustrated in FIGS. 1 to 3, the groove portions 130 and the rib portions 140 may be continuously and repeatedly formed at equal intervals along a circumferential direction with reference to a central axis line of the hollow portion 110 formed in the boss part 100.

The rib portions 140 may be further inserted in an axial direction than an edge of the hollow portion 110 formed in the boss part 100 and an outer edge of the boss part 100 where the first coupling surface 120 is formed.

The rib portions 140 may include a plurality of first protrusions 141, a plurality of second protrusions 142, and a plurality of protrusions 143.

The first protrusions 141 may extend in an outer periphery direction from the edge of the hollow portion 110 formed in the boss part 100.

In this case, one ends of the first protrusions 141 may be spaced a predetermined distance from the edge of the hollow portion 110 formed in the boss part 100.

As illustrated in FIG. 3, the first protrusions 141 may be disposed radially with respect to the central axis line of the hollow portion 110 formed in the boss part 100.

The first protrusions 141 may be formed to have a thickness of 3.5 to 4.5 mm from the bottom surface of the groove portion 130 along the axial direction of the boss part 100.

In addition, the first protrusions 141 may be formed to have a thickness of 2.0 to 4.0 mm along a concentric circle direction of the hollow portion 110 formed in the boss part 100.

One extending ends of the first protrusions 141 are integrally coupled to the second protrusions 142, and the second protrusions 142 form a concentric circle with the central axis line of the hollow portion 110 formed in the boss part 100.

The second protrusion 142 may be formed to have a thickness of 3.5 to 4.5 mm from the groove portion 130 along the axial direction of the boss part 100.

That is, the second protrusion is formed to have a ring shape and is disposed between the first protrusions 141 and third protrusions 143 to be described below.

The third protrusions 143 are coupled from the periphery of the second protrusion 142 to the outer edge of the boss part 100 where the first coupling surface 21 is formed.

The third protrusions 143 may be disposed radially with respect to the central axis line of the hollow portion 110 formed in the boss part 100.

The third protrusions 143 may be disposed between the first protrusions 141, and the number of the third protrusions 143 may be twice the number of the first protrusions 141.

In addition, the third protrusion 143 may be formed to have a thickness of 3.5 to 4.5 mm from the groove portion 130 along the axial direction of the boss part 100. The third protrusions 143 may be formed to have a thickness of 1.0 to 2.0 mm along the concentric circle direction of the hollow portion 110 formed in the boss part 100.

For example, as illustrated in FIG. 3, eighteen first protrusions 141 may be arranged and thirty-six third protrusions 143 may be arranged. The number of the first protrusions 141 and the number of the third protrusions 143 may be variously changed if necessary.

Furthermore, it is preferable that both axial-direction surfaces of the boss part 100 where the groove portions 130 are formed have a thickness of 3.5 to 4.5 mm, but the thickness of both axial-direction surfaces of the boss part 100 may be variously changed if necessary.

Consequently, since the first coupling surface 120 and the second coupling surface 210 are formed to have a curved shape such as a wave pattern and are coupled in a male-female configuration, the contact area therebetween may be increased and the curve is formed along the rotational direction, thereby increasing the coupling strength.

Since it is possible to reduce shrinkage after injection molding, no gaps are formed at the coupling portion between the teeth 230 and the boss part 100, thereby ensuring the reliability of products.

In addition, since the gas discharge hole (not illustrated) can be formed on the first coupling surface 120 and the second coupling surface 210, the coupling strength is not reduced while improving the gas discharge performance.

The coupling surfaces of the boss part and the tooth-shaped part are formed to have a curved shape such as a wave pattern and are coupled in a male-female configuration, so that a contact area therebetween is increased and a curve is formed along a rotational direction, thus increasing a coupling strength.

Since it is possible to reduce shrinkage after injection molding, no gaps are formed at the coupling portion between the teeth and the boss part, thus ensuring the reliability of products.

The worm wheel of the reduction gear for the EPS according to specific embodiments of the present invention

DESCRIPTION OF REFERENCE NUMERALS

| | |
|---|---|
| 10: shaft | 100: boss part |
| 110: hollow portion | 120: first coupling surface |
| 121: first convex surface | 122: first concave surface |
| 130: groove portion | 140: rib portion |
| 141: first protrusion | 142: second protrusion |
| 143: third protrusion | 200: tooth-shaped part |
| 210: second coupling surface | 211: second convex surface |
| 212: second concave surface | 220: spacing portion |
| 230: teeth | C: center |
| G1: first gap | G2: second gap |
| T1: first thickness | T2: second thickness |
| T3: third thickness | T4: fourth thickness |

What is claimed is:

1. A worm wheel of a reduction gear for an electric power steering, comprising:
   a boss part having
      a hollow portion formed along an axial-direction center for coupling with a shaft, and
      first coupling surfaces, each of which is formed by a first convex surface and a first concave surface continuously repeated along an outer peripheral; and
   a tooth-shaped part having
      a plurality of teeth continuously formed along an outer peripheral thereof with spacing portions interposed therebetween, and
      second coupling surfaces, each of which is formed by a second convex surface and a second concave surface continuously repeated along an inner peripheral,
   wherein the second coupling surfaces are coupled corresponding to the first coupling surfaces such that the tooth-shaped part is coupled onto the boss part, and wherein
      a center of each first convex surface of the first coupling surfaces and each corresponding second concave surface of the second coupling surfaces is located to match a center of corresponding tooth of the plurality of teeth, and
      a center of each first concave surface of the first coupling surfaces and each corresponding second convex surface of the second coupling surfaces is located to match a center of corresponding spacing portion of the plurality of teeth.

2. The worm wheel according to claim 1, wherein the each first convex surface and the each corresponding first concave surface are mutually coupled to form a wave-shaped curved surface, and the each second convex surface and the each corresponding second concave surface are mutually coupled to form a wave-shaped curved surface.

3. The worm wheel according to claim 1, wherein a center of a horizontal line connecting adjacent centers of the spacing portions and the first convex surface is formed at intervals of 1.0 to 2.0 mm.

4. The worm wheel according to claim 1, wherein a center of the each first concave surface and the each corresponding spacing portion is formed at intervals of 2.0 to 3.0 mm.

5. The worm wheel according to claim 1, wherein the first coupling surfaces and second coupling surfaces are spaced apart on both axial-direction sides of the boss part.

6. The worm wheel according to claim 1, further comprising a plurality of groove portions and a plurality of rib portions correspondingly formed on both axial-direction surfaces of the boss part between the hollow portion and the first coupling surfaces,
   wherein the plurality of groove portions and the plurality of rib portions are continuously and repeatedly formed at equal intervals along a circumferential direction with reference to a central axis line of the hollow portion.

7. The worm wheel according to claim 6, wherein the rib portion comprises:
   a plurality of first protrusions extending in an outer periphery direction from an edge of the hollow portion and arranged radially with respect to a center axis line;
   a plurality of second protrusions to which one extending ends of the plurality of first protrusions are integrally coupled and which form a concentric circle with the central axis line of the hollow portion; and
   a plurality of third protrusions connected from a periphery of the plurality of second protrusions to the first coupling surfaces and disposed radially with respect to the central axis line of the hollow portion.

8. The worm wheel according to claim 7, wherein each of the plurality of third protrusions are disposed between two first protrusions of the plurality of first protrusions and the number of the plurality of third protrusions is twice the number of the first protrusions.

9. The worm wheel according to claim 7, wherein the plurality of first protrusions, the plurality of second protrusions, and the plurality of third protrusion are formed to have a thickness of 3.5 to 4.5 mm from a bottom surface of the plurality of groove portions along an axial direction of the boss part.

10. The worm wheel according to claim 7, wherein the plurality of first protrusions are formed to have a thickness of 2.0 to 4.0 mm along a concentric circle direction of the hollow portion.

11. The worm wheel according to claim 7, wherein the both axial-direction surfaces of the boss part where the plurality of groove portions are formed are formed to have a thickness of 3.5 to 4.5 mm.

12. The worm wheel according to claim 7, wherein the plurality of third protrusions are formed to have a thickness of 1.0 to 2.0 mm along a concentric circle direction of the hollow portion.

* * * * *